United States Patent [19]
Kasori et al.

[11] Patent Number: 5,946,087
[45] Date of Patent: Aug. 31, 1999

[54] LASER SURVEY INSTRUMENT

[75] Inventors: Naoto Kasori; Shin-ichi Hayase; Ken-ichiro Yoshino, all of Tokyo-to, Japan

[73] Assignee: Kabushiki Kaisha Topcon, Tokyo-to, Japan

[21] Appl. No.: 09/003,960

[22] Filed: Jan. 7, 1998

[51] Int. Cl.⁶ .............................. G01B 11/26; G01C 9/18
[52] U.S. Cl. .................... 356/249; 356/139.1; 356/141.2
[58] Field of Search ...................... 356/249, 150, 356/152, 248, 250, 399, 400, 141.2, 141.5, 152.2, 141.4, 139.03; 33/281, 282, 285, 286, 290, 291, 292

[56] References Cited

U.S. PATENT DOCUMENTS

| | | | |
|---|---|---|---|
| 4,830,489 | 5/1989 | Cain et al. | 356/73 |
| 5,361,217 | 11/1994 | Makimura et al. | 364/561 |
| 5,485,266 | 1/1996 | Hirano et al. | 356/249 |
| 5,742,387 | 4/1998 | Ammann | 356/247 |
| 5,774,211 | 6/1998 | Ohtomo et al. | 356/141.2 |

*Primary Examiner*—Robert H. Kim
*Assistant Examiner*—Michael P. Stafira
*Attorney, Agent, or Firm*—Nields, Lemack & Dingman

[57] ABSTRACT

The present invention provides a laser survey instrument, which comprises a rotary irradiation system main unit and an object reflector, wherein said object reflector has reflection sectors divided into two or more, at least one of the reflection sectors has a reflection surface with shape gradually changing, and said rotary irradiation system main unit comprises a light emitter for emitting a polarized irradiation light beam, a rotator for rotating and irradiating the polarized irradiation light beam toward the object reflector and for detecting an irradiating direction, a tilt setting unit for tilting a rotary irradiation plane of the polarized irradiation light beam, a detecting means for detecting a polarized reflection light beam entering the rotary irradiation system main unit via said rotator and reflected from said object reflector, a reflection light detecting circuit for identifying the object reflector from output of the detecting means, and a control unit for tracing said object reflector by operating said tilt setting unit based on detecting condition of said reflection light detecting circuit and for tilting the rotation plane of said polarized irradiation light beam.

10 Claims, 9 Drawing Sheets

FIG. 7
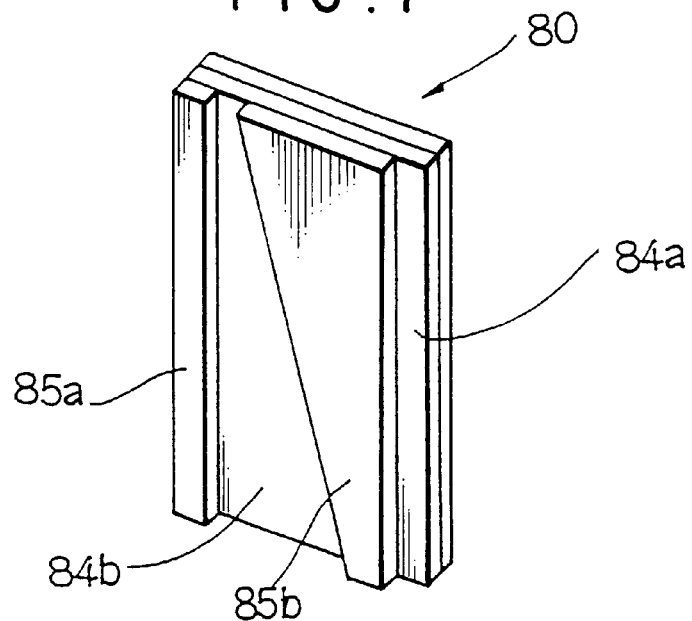
FIG. 8
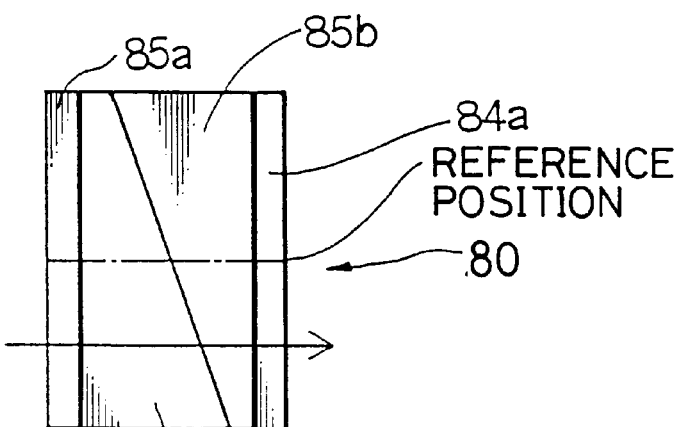
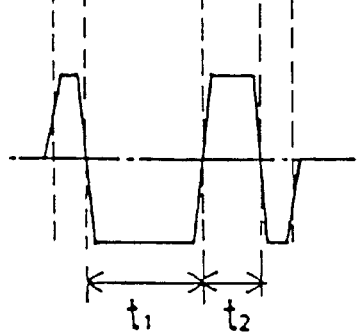

LASER SURVEY INSTRUMENT

BACKGROUND OF THE INVENTION

The present invention relates to a laser survey instrument, by which it is possible to form a measurement plane, in particular an arbitrary tilt setting plane tilted by a given angle with respect to a horizontal reference plane in addition to a horizontal reference plane, by using a laser beam.

In order to obtain a horizontal reference level for wide range, a laser survey instrument is used to replace an optical leveling device.

By the laser survey instrument, it is possible to easily obtain a horizontal reference plane by rotary irradiation of a laser beam in a horizontal direction and to obtain a horizontal reference line by irradiating a laser beam to wall or the like, and the instrument of this type has been widely used as the means to obtain a reference level.

As the laser beam to be irradiated, both visible light and invisible light are used. When visible light is used, visibility is inferior under sunlight, and it is mostly used for indoor applications such as positioning of window frame or ceiling assembly during construction or reconstruction of a building. When invisible light is used, photoelectric conversion photodetector is employed on light receiving side, and the laser survey instrument can be used for both indoor and outdoor applications. In outdoor applications, it is used to form a reference plane for foundation of building or for ground leveling work.

In recent years, tilted ceilings are designed in many new buildings and a tilted reference plane or a tilted reference line are required for setting-out operation, for example, to mount indoor light to suit the ceiling surface or the work to install handrail along staircase.

However, the conventional type laser survey instrument as described above is primarily designed to form a horizontal reference plane or a horizontal reference line, and a tilted reference plane or a tilted reference line cannot be easily formed. For this reason, the conventional type instrument is not suitable for outdoor work or indoor interior work of a building having tilted portion. It is not possible to provide high working accuracy in mounting indoor light to suit the ceiling surface or in installing handrail along staircase as described above, and there are strong demands on the laser survey instrument, by which it is possible to easily perform tilt setting and to obtain a tilted reference plane and a tilted reference line.

SUMMARY OF THE INVENTION

It is an object of the present invention to provide a laser survey instrument, by which it is possible to easily form a tilted reference plane and a tilted reference line.

To attain the above object, the laser survey instrument according to the present invention comprises a rotary irradiation system main unit and an object reflector, wherein said rotary irradiation system main unit has a light emitter for emitting a laser beam, a rotator for rotating and irradiating a laser beam, setting means for scanning a laser beam from said rotator reciprocally around a predetermined direction, a tilt setting unit for tilting a rotary irradiation plane of a laser beam, detecting means for detecting a reflection light beam entering said rotary irradiation system main unit via said rotator and reflected from said object reflector, a reflection light detecting circuit for identifying a position of said object reflector from output of said detecting means, and a control unit for controlling said tilt setting unit to direct a laser beam toward a predetermined position of said object reflector based on the detection of said reflection light detecting circuit, and said object reflector has at least one reflection sector designed in a shape to discriminate the scanning position of a laser beam. Also, the laser survey instrument according to the present invention, wherein a tilting direction set by said tilt setting unit correspond with said direction set by said setting means. Also, the laser survey instrument according to the present invention comprises a rotary irradiation system main unit and an object reflector, wherein said object reflector has reflection sectors divided into two or more, at least one of the reflection sectors has a reflection surface with shape gradually changing, and said rotary irradiation system main unit comprises a light emitter for emitting a polarized irradiation light beam, a rotator for rotating and irradiating the polarized irradiation light beam toward the object reflector and for detecting an irradiating direction, a tilt setting unit for tilting a rotary irradiation plane of the polarized irradiation light beam, detecting means for detecting a polarized reflection light beam entering the rotary irradiation system main unit via said rotator and reflected from said object reflector, a reflection light detecting circuit for identifying the object reflector from output of the detecting means, and a control unit for tracing said object reflector by operating said tilt setting unit based on detecting condition of said reflection light detecting circuit and for tilting the rotation plane of said polarized irradiation light beam. Further, the laser survey instrument of the present invention comprises a rotary irradiation system main unit and an object reflector, wherein said object reflector has reflection sectors divided into two or more, at least one of said reflection sectors is a polarization converting reflection sector, and at least one of said reflection sectors has a reflection surface with shape gradually changing, said rotary irradiation system main unit comprises a light emitter for emitting a polarized irradiation light beam, a rotator for rotating and irradiating the polarized irradiation light beam toward the object reflector and for detecting an irradiating direction, a tilt setting unit for tilting a rotary irradiation plane of the polarized irradiation light beam, a first detecting means for detecting a direction of polarization different from that of the polarized irradiation light beam emitted from the rotary irradiation system among the polarized reflection light beam entering the rotary irradiation system main unit via said rotator and reflected from said object reflector, a second detecting means for detecting the same direction of polarization as that of the polarized irradiation light beam irradiated from the rotary irradiation system, and a control unit having a reflection light detecting circuit for identifying irradiating condition of the polarized irradiation light beam toward the object reflector by comparing output of said first detecting means with output of said second detecting means, for tracing said object reflector by operating said tilt setting unit based on detecting condition of said reflection light detecting circuit and for tilting the rotation plane of said polarized irradiation light beam. Also, the laser survey instrument of the present invention has such feature that the polarized irradiation light beam irradiated from the rotator is circularly polarized light. Further, the laser survey instrument of the present invention has such feature that a tilting direction of the tilt setting unit is selected, the polarized irradiation light beam is irradiated for reciprocal scanning at a predetermined angle around the selected tilting direction, said control unit traces the object reflector based on the detecting condition of the reflection light detecting circuit and tilts the rotation plane of said polarized irradiation light beam. Also, the laser survey instrument of the present invention has such arrangement that two tilting directions can be set by setting another tilting direction within a predetermined time after the setting of a first tilting direction. Further, the laser survey instrument of the present invention has such arrangement that a tilt angle is set by holding the object reflector for a predetermined duration of time. Also, the laser survey instrument of the present invention has such arrangement that all of the reflection sectors of the object reflector are polarization maintaining reflection sectors, which reflect light as a polarized reflection light beam, maintaining the direction of polarization of the polarized irradiation light beam. Also, the laser survey instrument of the present invention has such arrangement that all of the reflection sectors of the object reflector are polarization converting reflection sectors, which reflect light as a polarized reflection light beam, converting direction of polarization of the polarized irradiation light beam. Further, the laser survey instrument of the present invention has such arrangement that at least one of the reflection sectors of the object reflector is a polarization converting reflection sector, which reflects light as a polarized reflection light beam, converting the direction of polarization of the polarized irradiation light beam, and at least one of the reflection sectors is a polarization maintaining reflection sector, which reflects light as a polarized reflection light beam, maintaining direction of polarization of the polarized irradiation light beam.

BRIEF DESCRIPTION OF THE DRAWINGS

FIG. 7 is a perspective view of an object reflector of the above embodiment of the present invention;

FIG. 8 (A) is a front view of the object reflector, and FIG. 8 (B) is a diagram showing photodetection signal obtained from the light reflected by the object reflector;

DETAILED DESCRIPTION OF THE PREFERRED EMBODIMENT

In the following, description will be given on an embodiment of the present invention referring to the attached drawings.

Figure 1:
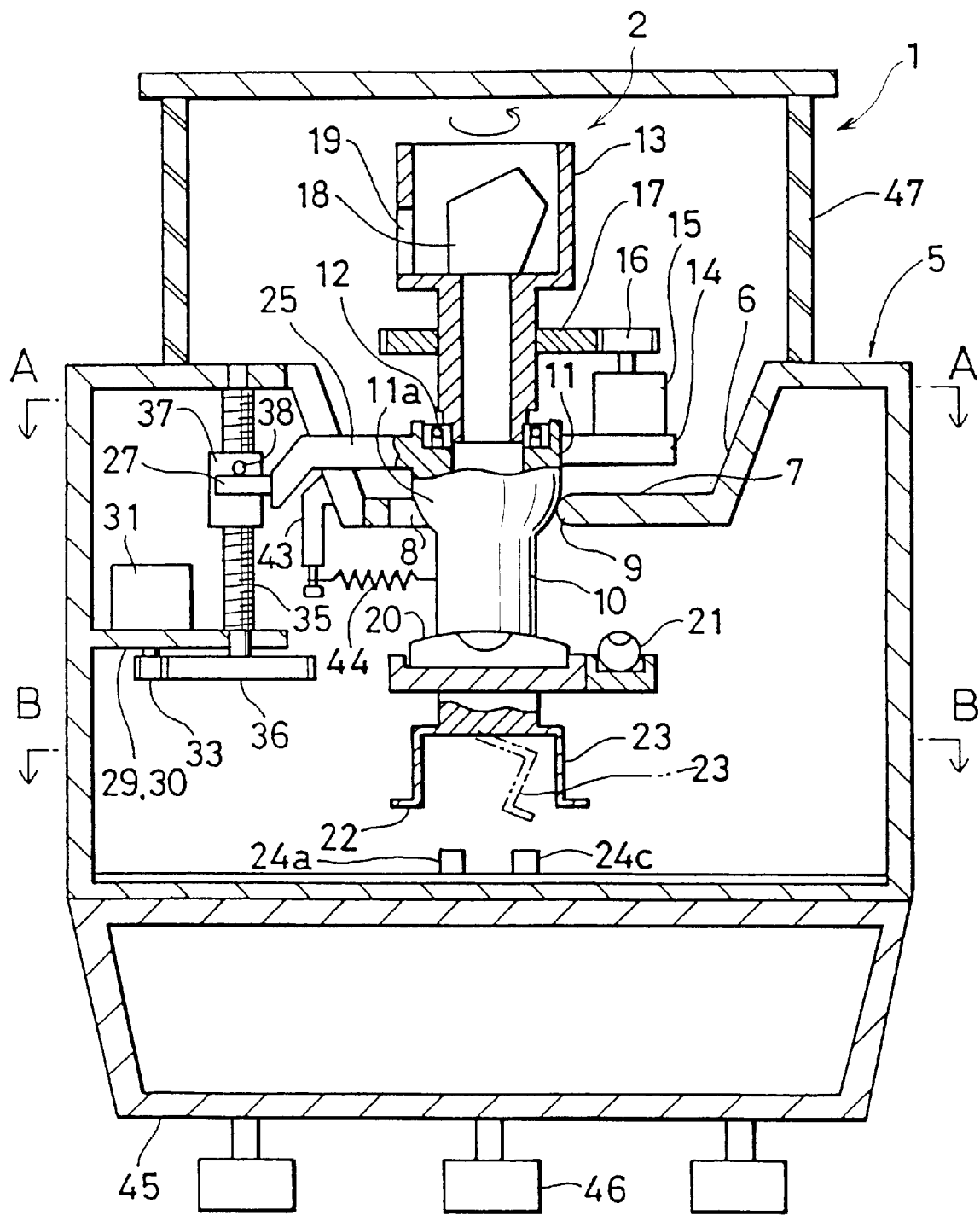
FIG. 1 is a longitudinal sectional view showing a mechanical portion of an embodiment of the present invention.
Figure 2:
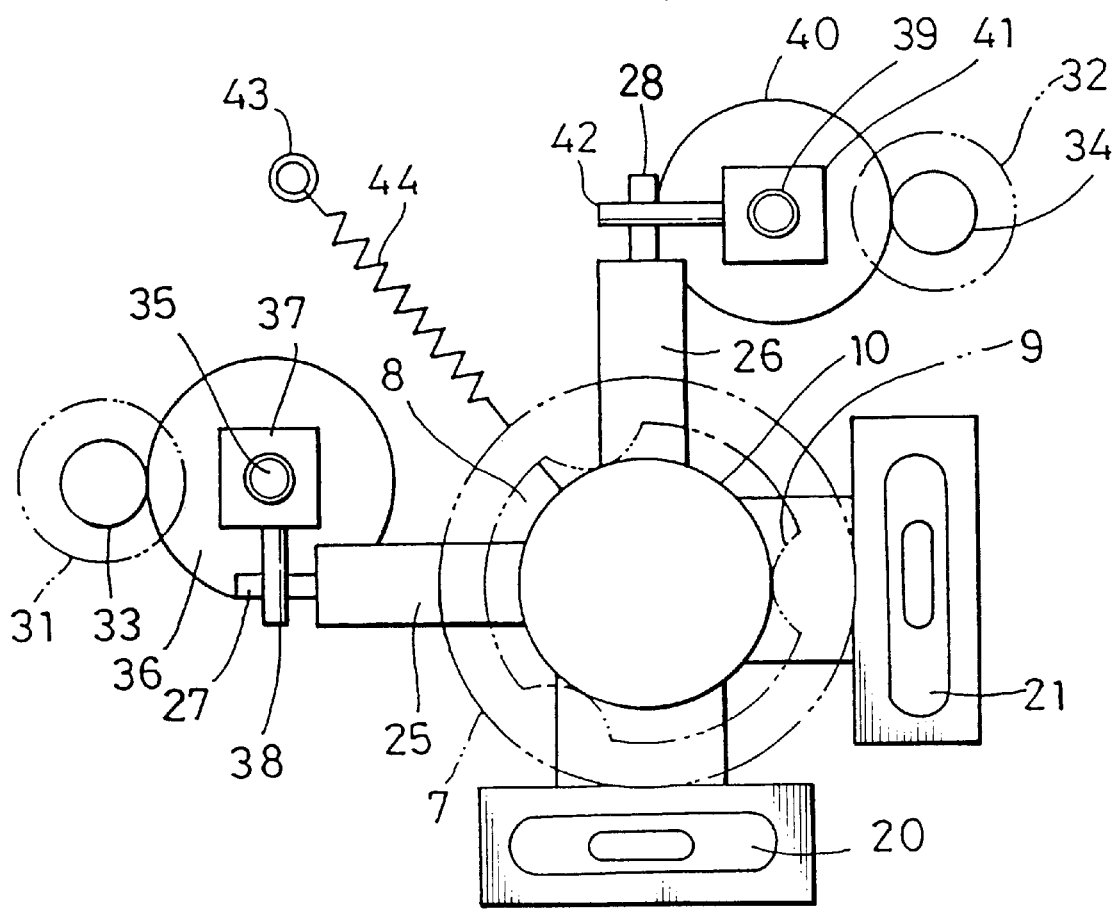
FIG. 2 is an arrow diagram along the line A—A of FIG. 1.
Figure 3:
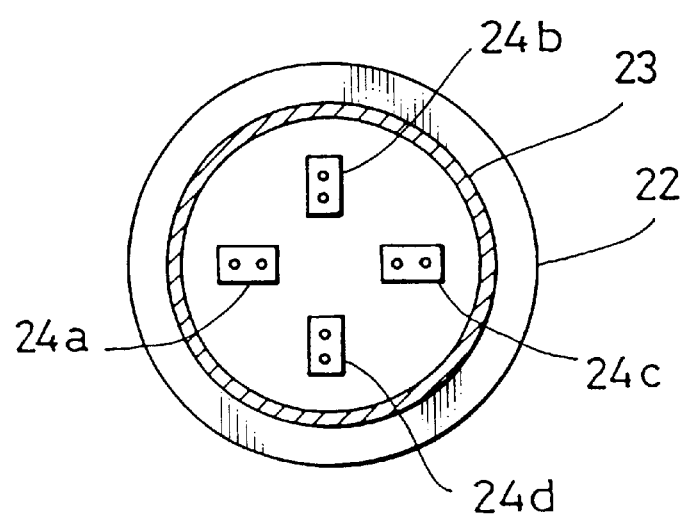
FIG. 3 is an arrow diagram along the line B—B of FIG. 1.

FIG. 1 to FIG. 3 each represents a mechanical portion of a rotary irradiation system main unit 1. Description will be given below on the mechanical portion.

At the center of a casing 5, a recessed portion 6 in truncated conical shape is formed, and a support seat 7 is provided at the center of the recessed portion 6. The support seat 7 is designed in such manner that a projection 9 protruding toward the center with smooth tertiary curved surface is formed at each of three equally divided positions on inner periphery of a circular through-hole 8.

A laser projector 10 for emitting a laser beam is placed into the through-hole 8, and a head 11 of the laser projector 10 is engaged with and supported by the support seat 7. The head 11 has its lower portion in spherical shape, and a spherical unit 11a thus formed is brought into contact with each of the three projections 9. The laser projector 10 can be tiltably supported in any direction desired with respect to the vertical line.

A motor seat 14 is provided on the head 11, and a scanning motor 15 is arranged on the motor seat 14. A driving gear 16 is engaged on an output shaft of the scanning motor 15. The driving gear 16 is engaged with a scanning gear 17 to be described later. On the head 11 of the laser projector 10, a mirror holder 13 is rotatably mounted via a bearing 12 being aligned with an axis of the laser projector 10. The scanning gear 17 is attached on the mirror holder 13 and is engaged with the driving gear 16 as described above so that the mirror holder 13 can be rotated around the vertical axis by the scanning motor 15. A pentagonal prism 18 is arranged on the mirror holder 13, and a laser beam emitted from the laser projector 10 is irradiated in a horizontal direction through a projection window 19. The scanning motor 15, the driving gear 16, the mirror holder 13, the pentagonal prism 18, etc. constitute a rotator 2.

A first level sensor 20 and a second level sensor 21 for detecting a horizontal line or plane are provided below the laser projector 10. At the lower end of the laser projector 10, a tilting detector 23 is fixed. The tilt detector 23 is designed in shape of an inverted cup, and a reflection mirror flange 22 is arranged on the periphery.

On the bottom of the casing 5 and at positions opposite to the tilt detector 23, a given number (four in the present embodiment) of optical sensors 24a, 24b, 24c, and 24d each comprising a set each of light emitting elements and photodetection elements are provided on the same circumference around the axis of the laser projector 10 when the casing 5 and the laser projector 10 are at vertical position.

From the head 11 of the laser projector 10, a first tilting arm 25 and a second tilting arm 26 are extended in a horizontal direction and perpendicularly to each other. These are designed to penetrate conical plane of the recessed portion 6 and are positioned inside the casing 5. On tip of each of the first tilting arm 25 and the second tilting arm 26, engaging pins 27 and 28 are arranged respectively. The engaging pins 27 and 28 are designed in cylindrical shape, and axes of the cylinders crossing perpendicularly to each other are positioned in such manner that these axes are included within a plane, which passes through spherical center of the spherical unit 11a. For one of the engaging pins 27 and 28, e.g. the engaging pin 27, the movement in a horizontal direction is restricted, and it can be moved only in a vertical direction. Although not shown in the figures, the engaging pin 27 is slidably engaged in a guide groove extending in a vertical direction, or the engaging pin 27 is slidably pressed against wall surface extending in a vertical direction via resilient means such as a spring, etc.

On inner wall of the casing 5, shelf plates 29 and 30 are mounted. A first level adjusting motor 31 is mounted on the shelf plate 29, and a second level adjusting motor 32 is mounted on the shelf plate 30. A first driving gear 33 is engaged on a rotation shaft of the first level adjusting motor 31, and a second driving gear 34 is engaged on a rotation shaft of the second level adjusting motor 32. A first screw shaft 35 running perpendicularly to the engaging pin 27 and stretched between the ceiling of the casing 5 and the shelf plate 29 is rotatably arranged. A first driven gear 36 is mounted on the first screw shaft 35 and is engaged with the first driving gear 33. The first screw shaft 35 is screwed into a first slide nut 37, and a pin 38 is protruded from the first slide nut 37. The pin 38 is slidably abutted on the engaging pin 27.

Similarly, a second screw shaft 39 running perpendicularly to the engaging pin 28 and stretched between the ceiling of the casing 5 and the shelf plate 30 are rotatably arranged. A second driven gear 40 is engaged on the second screw shaft 39 and is engaged with the second driving gear 34. The second screw shaft 39 is screwed into a second slide nut 41, and a pin 42 is protruded from the second slide nut 41. The pin 42 is slidably abutted on the engaging pin 28.

In the ceiling portion of the casing 5, a spring receptacle 43 is arranged between the first screw shaft 35 and the second screw shaft 39, and a spring 44 is stretched between the spring receptacle 43 and the laser projector 10 so that the laser projector 10 is pushed in clockwise direction around the support seat 7 as shown in FIG. 1.

In the FIG. 1, reference numeral 45 represents a battery box to accommodate a battery for driving the laser survey instrument. The rotary irradiation system main unit 1 is mounted on a tripod (not shown) via screws 46 for leveling. Reference numeral 47 represents a glass window provided on the periphery of the mirror holder 13.

Figure 4:
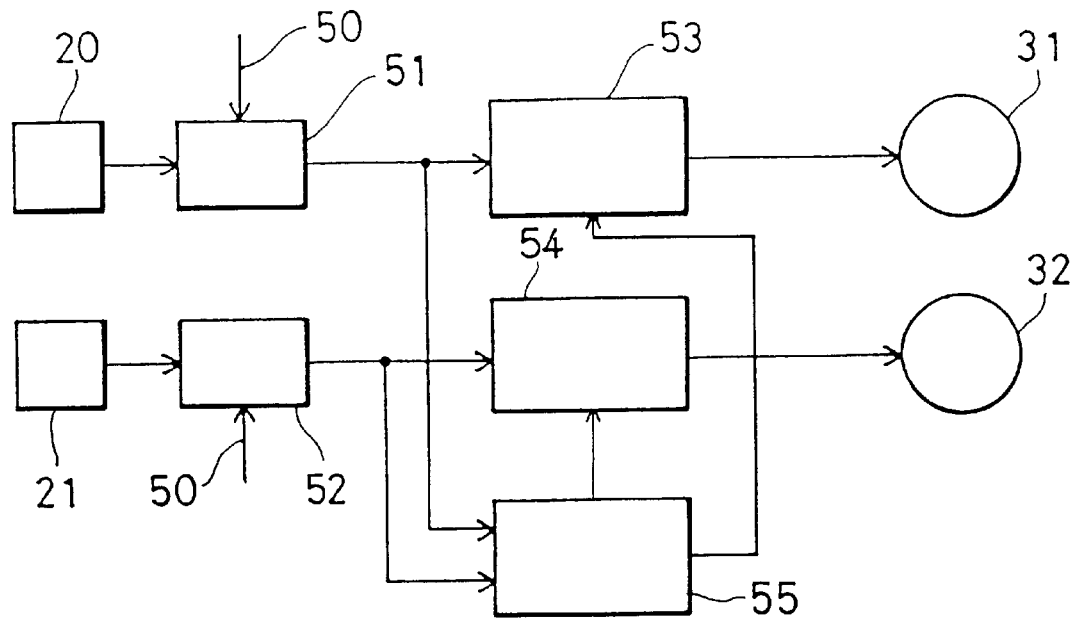
FIG. 4 is a block diagram of a tilting controller of the above embodiment of the present invention.

Next, FIG. 4 is a block diagram to show a tilting controller of the present embodiment.

Detection results of the first level sensor 20 and the second level sensor 21 are inputted to a first angle detecting circuit 51 and a second angle detecting circuit 52. On the first angle detecting circuit 51 and the second angle detecting circuit 52, a reference angle 50 (usually, the reference plane is horizontal and the reference angle is 0°) is set. Angular deviations are calculated in the first angle detecting circuit 51 and the second angle detecting circuit 52 respectively based on the reference angle 50. The angular deviation thus calculated is inputted to a first motor controller 53 and a second motor controller 54 respectively or to a computation controller 55. The computation controller 55 inputs control signal such as rotating direction instruct signal, speed control signal and speed acceleration/deceleration signal, etc. to the first motor controller 53 and the second motor controller 54. The first motor controller 53 and the second motor controller 54 drive the first level adjusting motor 31 and the second level adjusting motor 32 respectively. The computation controller 55 controls the first level adjusting motor 31 and the second level adjusting motor 32 via the first motor controller 53 and the second motor controller 54 so that deviation of angular signal from the first angle detecting circuit 51 and the second angle detecting circuit 52 is turned to 0.

In the following, description will be given on leveling operation of the laser survey instrument.

When the rotary irradiation system main unit 1 is installed and is not yet adjusted, the axis of the laser projector 10 is not aligned with a vertical line, and the first level sensor 20 and the second level sensor 21 are not at a horizontal position. When the reference angle 50 is 0°, angular deviation signals are issued from the first angle detecting circuit 51 and the second angle detecting circuit 52 to the computation controller 55. When the angular deviation signals are outputted, the computation controller 55 drives the first level adjusting motor 31 and the second level adjusting motor 32 in a desired direction via the first motor controller 53 and the second motor controller 54 so that each of the angular deviation signals is turned to 0.

Description will be given on operation of the level adjusting motors 31 and 32, taking an example on the first level adjusting motor 31.

When the first level adjusting motor 31 is driven, rotation of the first level adjusting motor 31 is transmitted to the first screw shaft 35 via the first driving gear 33 and the first driven gear 36, and the first slide nut 37 is moved up or down as the first screw shaft 35 is turned. Upward or downward movement of the first slide nut 37 is transmitted to the first tilting arm 25 via the pin 38 and the engaging pin 27, and the laser projector 10 is tilted.

As described above, the engaging pin 27 is restricted from moving in a horizontal direction and can move only in a vertical direction. For this reason, a tilting direction of the laser projector 10 is restricted, and it is tilted around the axis of the engaging pin 28, which runs through the spherical center of the spherical unit 11a. Next, when the second level adjusting motor 32 is driven, the second screw shaft 39 is turned, and the engaging pin 28 is moved up or down via the pin 42.

The movement of the engaging pin 27 in a horizontal direction is restricted by a groove (not shown), and its movement in a vertical direction is restricted by the pin 38 and the spring 44. As a result, the engaging pin 27 is allowed only to rotate around the axis of the engaging pin 27, which runs through the spherical center of the spherical unit 11a. When the pin 42 is moved up and down, the engaging pin 28 slides in an axial direction between the engaging pin 28 and the pin 42, and the engaging pin 28 is vertically displaced, and the laser projector 10 is tilted around the axis of the engaging pin 27. As described above, cross-section of the engaging pin 27 is in circular shape. Thus, tilting of the axis of the engaging pin 27 is not changed due to the rotation of the engaging pin 27. That is, tilting operation by the level adjusting motors 31 and 32 exerts no influence on tilting axis of the other, i.e. on tilting of the axes of the engaging pins 27 and 28. Therefore, tilt adjusting operation of one axis can be performed independently from tilt adjusting operation of the other axis, and the tilt adjusting operation and control sequence relating to the tilt adjusting operation can be extremely simplified.

Because the laser projector 10 is pushed in clockwise direction in FIG. 1 by the spring 44, the laser projector 10 accurately follows the movement of the first slide nut 37.

There are provided the optical sensors 24a, 24b, 24c and 24d to prevent the movement of the adjusting mechanism (which comprises the first level adjusting motor 31, the second level adjusting motor 32, the first driving gear 33, the second driving gear 34, the first driven gear 36, the second driven gear 40, the first screw shaft 35, the second screw shaft 39, the first slide nut 37, the second slide nut 41, the first tilting arm 25, the second tilting arm 26, etc.) beyond the mechanical adjustment range. Specifically, when the limit of the mechanical adjustment range is reached, light emitted from one of the optical sensors 24a, 24b, 24c or 24d is reflected by the reflection mirror flange 22 and is received by the optical sensor again, and it is detected that the limit of the mechanical adjustment range has been reached. Then, the first level adjusting motor 31 and the second level adjusting motor 32 are stopped, or display is provided on a display unit (not shown) or alarm such as buzzer is issued to indicate that the limit of the mechanical adjustment range has been reached.

With regard to tilting operation of the laser projector 10, the laser projector 10 is stably supported because the spherical unit 11a of the laser projector 10 is supported at 3 points by the projections 9. Because it is the contact between the spherical unit 11a and the projections 9 with smooth curved surfaces, the laser projector 10 can be tilted in any tilting direction smoothly and freely, and the posture of the laser projector 10 can be easily adjusted. Detailed description on the tilting operation is not given here because it is the same as the leveling operation described above.

Figure 6:
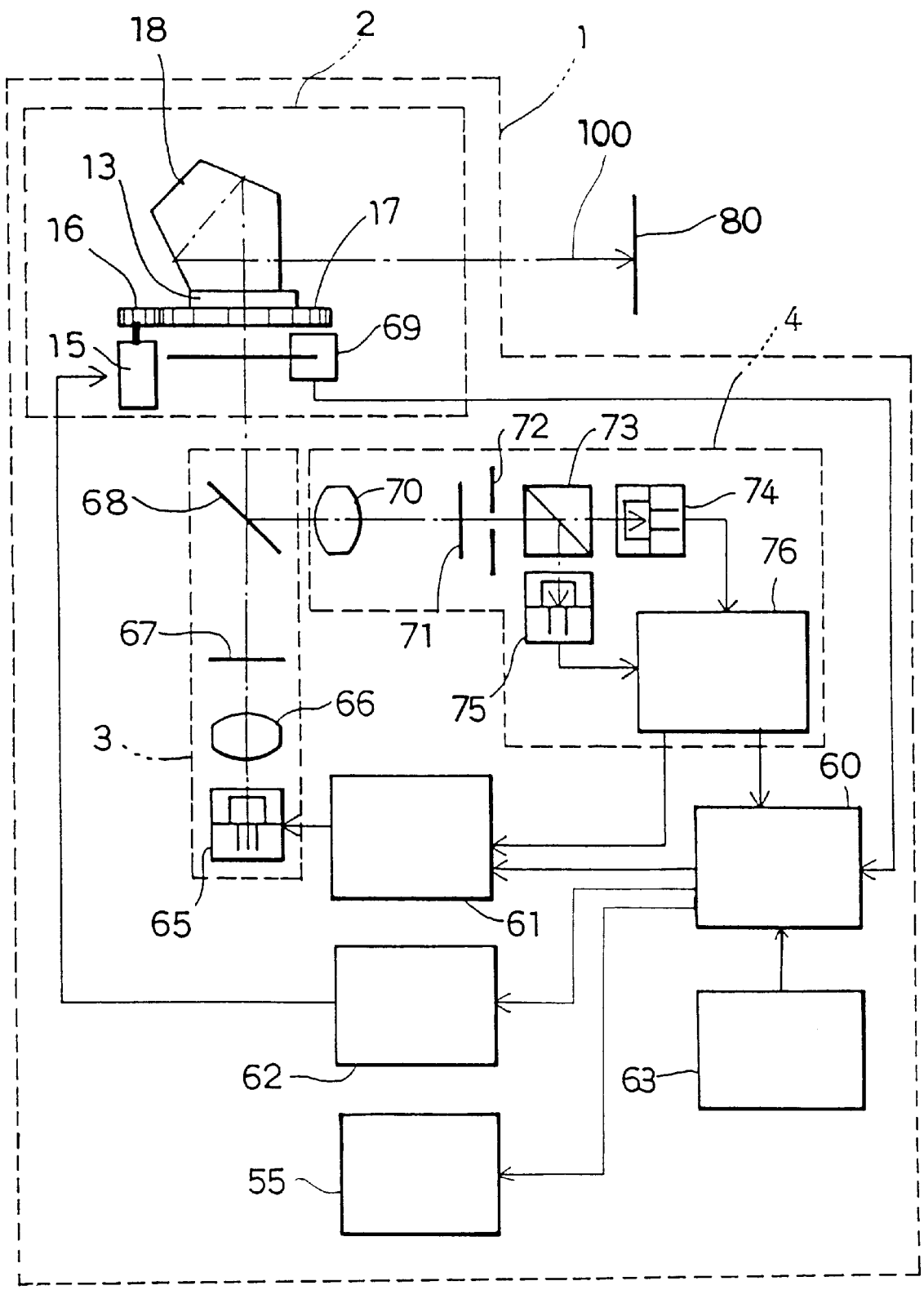
FIG. 6 is a block diagram showing optical and electrical arrangement of the rotary irradiation system main unit of the above embodiment of the present invention.
Figure 9:
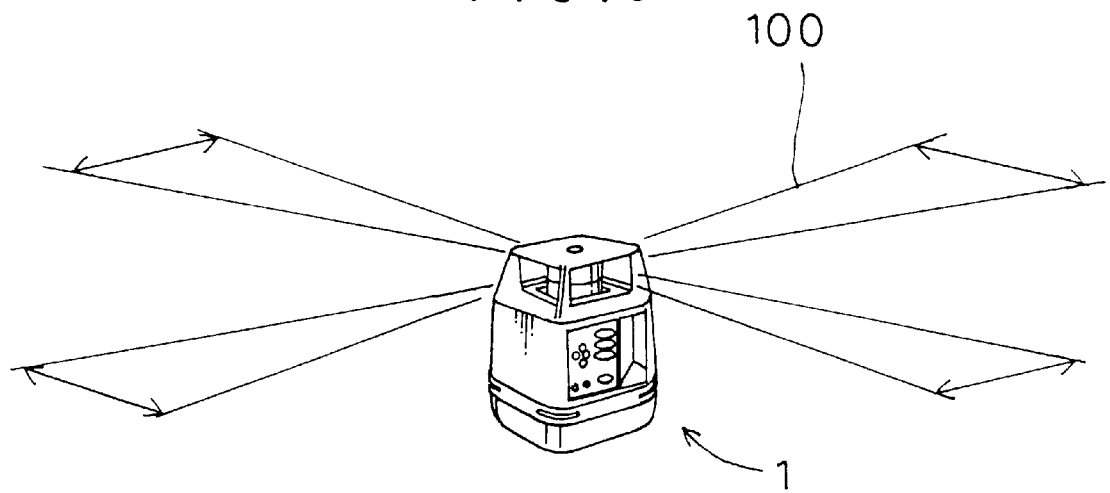
FIG. 9 is a drawing for explaining relationship between the rotary irradiation system main unit and tilting direction setting in the above embodiment of the present invention.

Now, description will be given on optical arrangement and electrical arrangement of the rotary irradiation system main unit 1 referring to FIG. 6.

In the figure, the same component as in FIG. 1 is referred by the same symbol. The rotary irradiation system main unit 1 comprises a light emitter 3, a rotator 2, a reflection light detector 4, a control unit (CPU) 60, a light emitting element driving unit 61, a motor driving unit 62, and a control panel 63.

First, the light emitter 3 is described.

On an optical axis of a laser diode or a visible laser diode 65, which emits a polarized irradiation light beam of linearly polarized light, a collimator lens 66, a first $\lambda/4$ birefringence member 67, and a perforated mirror 68 are arranged in this order as seen from the laser diode 65. The polarized irradiation light beam of linearly polarized light emitted from the laser diode 65 is turned to parallel beam by the collimator lens 66 and is converted to circularly polarized light by the first $\lambda/4$ birefringence member 67. The circularly polarized irradiation light beam passes through the perforated mirror 68 and is irradiated to the rotator 2.

The rotator 2 deflects an optical axis of the polarized irradiation light beam 100 emitted from the light emitter 3 by 90° and irradiates the light beam for scanning. A pentagonal prism 18 for deflecting the optical axis of the polarized irradiation light beam coming from the light emitter 3 is provided on the mirror holder 13, which is rotated around the optical axis of the polarized irradiation light beam. The mirror holder 13 is connected to a scanning motor 15 via a scanning gear 17 and a driving gear 16. The rotating condition of the mirror holder 13 is detected by an encoder 69, and a detection signal of the encoder 69 is inputted to the control unit (CPU) 60.

The irradiated laser beam from the rotator 2 is reflected by an object reflector 80, and a polarized reflection light beam coming from the object reflector 80 enters the rotator 2. After entering the pentagonal prism 18, the polarized reflection light beam is deflected toward the perforated mirror 68, and the polarized reflection light beam enters the reflection light detector 4 through the perforated mirror 68.

Next, the reflection light detector 4 will be described.

On an reflection optical axis of the perforated mirror 68, a condenser lens 70, a second $\lambda/4$ birefringence member 71, a pinhole 72, a polarization beam splitter 73, and a first photoelectric converter 74 are arranged in this order as seen from the perforated mirror 68, and a second photoelectric converter 75 is arranged on the reflection optical axis of the polarization beam splitter 73. Outputs from the first photoelectric converter 74 and the second photoelectric converter 75 are inputted to a reflection light detecting circuit 76.

The polarization beam splitter 73 splits the polarized reflection light beam entering the reflection light detector 4 and the light beam enters the first photoelectric converter 74 and the second photoelectric converter 75. The second $\lambda/4$ birefringence member 71 and the polarization beam splitter 73 are arranged in such manner that the polarized irradiation light beam, emitted from the light emitter 3 and having the same direction of polarization as that of the polarized reflection beam returning to the main unit after passing through the $\lambda/4$ birefringence member twice, is irradiated to the first photoelectric converter 74, and the polarized irradiation light beam emitted from the light emitter 3 and having the same direction of polarization as the polarized irradiation light beam is irradiated to the second photoelectric converter 75.

Next, description will be given on the control unit (CPU) 60.

To the control unit (CPU) 60, instruction from an operator is inputted via the control panel 63 and signals from the encoder 69 and the reflection light detector 4 are inputted. The position of the object reflector 80 and widths of a polarization converting reflection sector (to be described later) and a reflection layer (to be described later) of the object reflector 80 are detected, and rotation of the rotator 2 is controlled via the motor driving unit 62. Based on the relationship between widths of the polarization converting reflection sector (to be described later) and the reflection layer (to be described later) of the object reflector 80, it is detected which position on the object reflector 80 is scanned by the polarized irradiation light beam, and it is given as a scanning position signal. Based on the detected position, the signal from the control unit 60 is inputted to the computation controller 55, which drives in turn the level adjusting motors 31 and 32 via the motor controllers 53 and 54. The light emitting condition of the laser diode 65 is controlled according to the rotating condition of the rotator 2 via the light emitting element driving unit 61.

Next, description will be given on the light emitting element driving unit 61.

The light emitting element driving unit 61 obtains a clock signal for pulse modulation from the reflection light detecting circuit 76 and performs pulse modulation of the polarized irradiation light beam emitted from the laser diode 65. This pulse modulation makes it possible to easily amplify the photodetection signal and to decrease noise level.

Next, description will be given on the motor driving unit 62.

The motor driving unit 62 controls rotation of the scanning motor 15 of the rotator 2 based on a rotating direction signal from the control unit 60 and controls scanning of the polarized irradiation light beam.

Figure 5:
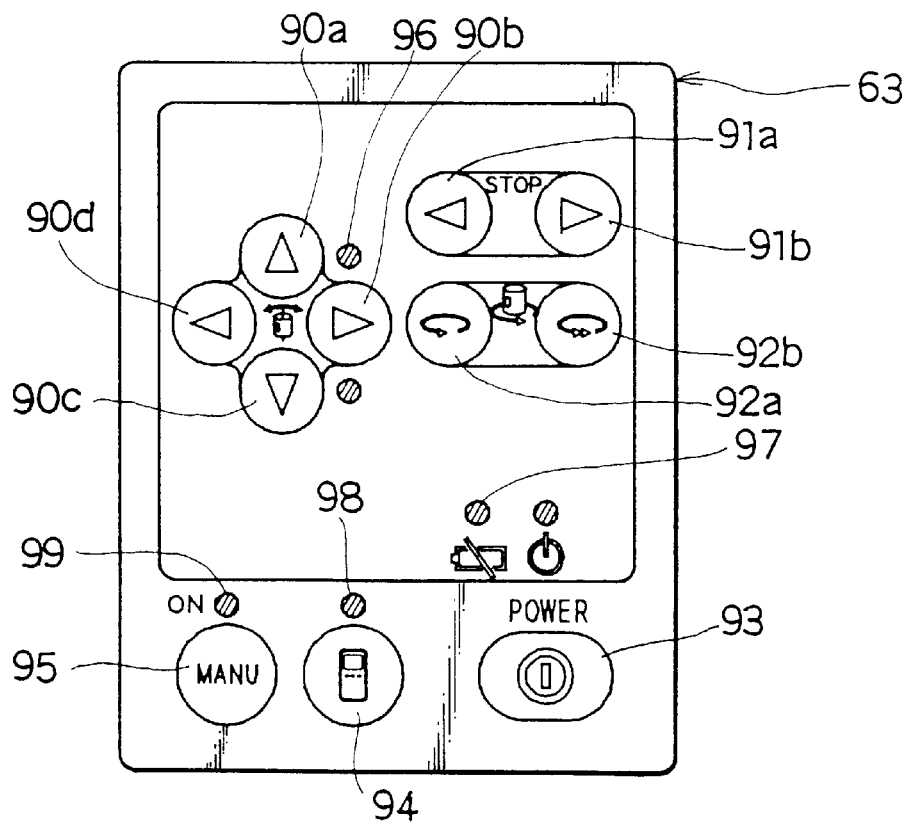
FIG. 5 is a drawing of a control panel to be installed on a rotary irradiation system main unit of the above embodiment of the present invention.

Next, description will be given on the control panel 63 referring to FIG. 5.

The control panel 63 comprises tilting direction setting buttons 90a, 90b, 90c, and 90d for setting a tilting direction (an irradiating direction of the laser beam for reciprocal scanning at a desired angle), stop mode buttons 91a and 91b for fixing an irradiating direction of the laser beam and for setting it to stop mode for step feeding, rotary scanning speed setting buttons 92a and 92b, a power source button 93, a photodetector setting button 94, which switches the rotary scanning speed of the laser beam between the case where a photodetector is used and the case where a visual check is performed because the rotary scanning speed is different in both of the cases, and a manual button 95 for selecting automatic leveling or manual adjustment of the system. The setting status by the tilting direction setting buttons 90a, 90b, 90c and 90d is displayed by a light emitting diode 96, battery consumption status of the rotary irradiation system main unit 1 is displayed by a light emitting diode 97, selecting status of the photodetector by the photodetector setting button 94 is displayed by a light emitting diode 98, and automatic or manual selection status of the manual button 95 is displayed by a light emitting diode 99.

In the following, description will be given on optical and electrical operation of the rotary irradiation system main unit 1 and on a method to detect the object reflector 80.

The polarized irradiation light beam emitted from the laser diode 65, which is driven by the light emitting element driving unit 61, is modulated according to the clock signal from an oscillator (not shown). The linearly polarized irradiation light beam emitted from the laser diode 65 is turned to parallel beam by the collimator lens 66. Further, it is turned to circularly polarized irradiation light beam after passing through the first $\lambda/4$ birefringence member 67. The circularly polarized irradiation light beam passes through the perforated mirror 68 and is deflected by an angle of 90° through the pentagonal prism 18 and is irradiated from the rotary irradiation system main unit 1.

The pentagonal prism 18 is rotated by the scanning motor 15 via the driving gear 16 and the scanning gear 17. At first, the pentagonal prism 18 is rotated by total circumferential rotation, and the polarized irradiation light beam coming through the pentagonal prism 18 is irradiated for total circumferential scanning.

Next, description will be given on the object reflector 80, referring to FIG. 7, FIG. 8 (A) and FIG. 8 (B).

On the object reflector 80, a $\lambda/4$ birefringence member in form of oblong tablet is attached along the left edge to form a polarization converting reflection sector 85a. A $\lambda/4$ birefringence member of inverted triangular shape is attached at a position opposite to the polarization converting reflection sector 85a to have a reflection layer (polarization maintaining reflection sector) 84b in erected triangular shape therebetween, thus forming a polarization converting reflection sector 85b. Further, a reflection layer (polarization maintaining reflection sector) 84a of oblong tablet shape is provided along the right edge.

As described above, the object reflector 80 comprises polarization maintaining reflection sectors 84a and 84b and polarization converting reflection sectors 85a and 85b. The polarization reflection light beam reflected by the polarization maintaining reflection sectors 84a and 84b is circularly polarized light where polarization status of the incident polarized irradiation light beam is maintained, and the polarized reflection light beam reflected by the polarization converting reflection sectors 85a and 85b is circularly polarized light having phase deviated by $\lambda/2$ with respect to the polarization status of the incident polarized irradiation light beam.

The polarized reflection light beam reflected by the object reflector 80 and entering the rotator 2 is deflected by an angle of 90° by the pentagonal prism 18 and enters the perforated mirror 68, and the perforated mirror 68 irradiates the reflection light beam toward the condenser lens 70. The condenser lens 70 irradiates the reflection light beam as convergent light toward the second $\lambda/4$ birefringence member 71, and the polarized reflection light beam, returning as circularly polarized light, is converted to linearly polarized light by the second $\lambda/4$ birefringence member 71 and enters the pinhole 72. As described above, the polarized reflection light beam reflected by the polarization maintaining reflection sectors 84a and 84b has its phase by $\lambda/2$ different from the phase of the polarized reflection light beam reflected by the polarization converting reflection sectors 85a and 85b. As a result, plane of polarization differs by 90° between the two polarized reflection light beams, which have been converted to linearly polarized light by the second $\lambda/4$ birefringence member 71.

For the reflection light beam, which has an optical axis deviated from that of the polarized irradiation light beam irradiated from the main unit and is not properly directed to the polarized reflection light beam, i.e. the reflection light beam from unnecessary reflector other than the object reflector 80, the pinhole 72 plays a role to prevent this reflection light beam from entering the first photoelectric converter 74 and the second photoelectric converter 75. After passing through the pinhole 72, the polarized reflection light beam enters the polarization beam splitter 73.

The polarization beam splitter 73 splits the light beam into polarized components, which run perpendicularly to each other. It allows the polarized reflection light beam to pass, which is the same as (but having direction of polarization varied by 180° from) the polarized irradiation light beam emitted from the laser diode 65 and reflects the polarized reflection light beam, which has direction of polarization by 90° different from that of the polarized irradiation light beam emitted from the laser diode 65. Both the first photoelectric converter 74 and the second photoelectric converter 75 receive the polarized reflection light beam thus split.

The first photoelectric converter 74 and the second photoelectric converter 75 are designed to have the following photodetecting conditions: When the polarized reflection light beam reflected by the polarization converting reflection sectors 85a and 85b of the object reflector 80 enters the reflection light detector 4, it is designed in such manner that the amount of light entering the first photoelectric converter 74 is more than the amount of light entering the second photoelectric converter 75 because of the relationship between the second $\lambda/4$ birefringence member 71 and the polarization beam splitter 73, and that when the polarized reflection light beam reflected by the polarization maintaining reflection sectors 84a and 84b of the object reflector 80 enters the reflection light detector 4, the amount of light entering the second photoelectric converter 75 is more than the amount of light entering the first photoelectric converter 74.

When the object reflector 80 is scanned by a laser beam, an output signal from the reflection light detecting circuit 76 is as shown in FIG. 8 (B). By detecting a point where widths (durations) t1 and t2 of the output signals agree with each other, the center of the object reflector 80 can be detected. In the output signal, signal waveform is asymmetrical. Therefore, even when laser beam scans the center of the object reflector 80, scanning direction of the laser beam can be identified only from the output signal from the reflection light detecting circuit 76.

Normally, when a reflection laser beam from the object reflector is received, it is not that photodetection signal rises up at the time of detection but it rises up with an inclination with some ambiguity just as the fact that the center of spot light of the reflected laser beam is brighter. In the object reflector 80 as shown in FIG. 7, the polarization maintaining reflection sector 84a and the polarization converting reflection sector 85a each in form of oblong tablet are formed on the edges of the polarization maintaining reflection sector 84b and the polarization converting reflection sector 85b in triangular shape. Thus, the transfer point of the photodetection signal can be easily identified, and the central position can be detected with high accuracy. Because a vertical direction can be identified from the object reflector itself, when the rotary irradiation system main unit 1 is installed on ceiling, floor, etc., it is possible to easily distinguish from reflection light, which is reflected by ceiling surface or floor surface and comes back.

The polarization maintaining reflection sector 84b and the polarization converting reflection sector 85b in inverted triangular shape make it possible to easily identify the central position of the object reflector 80, while these reflection sectors may be designed in V-shape or inverted V-shape. In addition, there is no restriction on the shape so far as the width is varied in a vertical direction and the central position can be detected from the change in width.

Next, description will be given on tilt setting operation by the laser survey instrument referring to FIG. 9 to FIG. 13.

Figure 11:
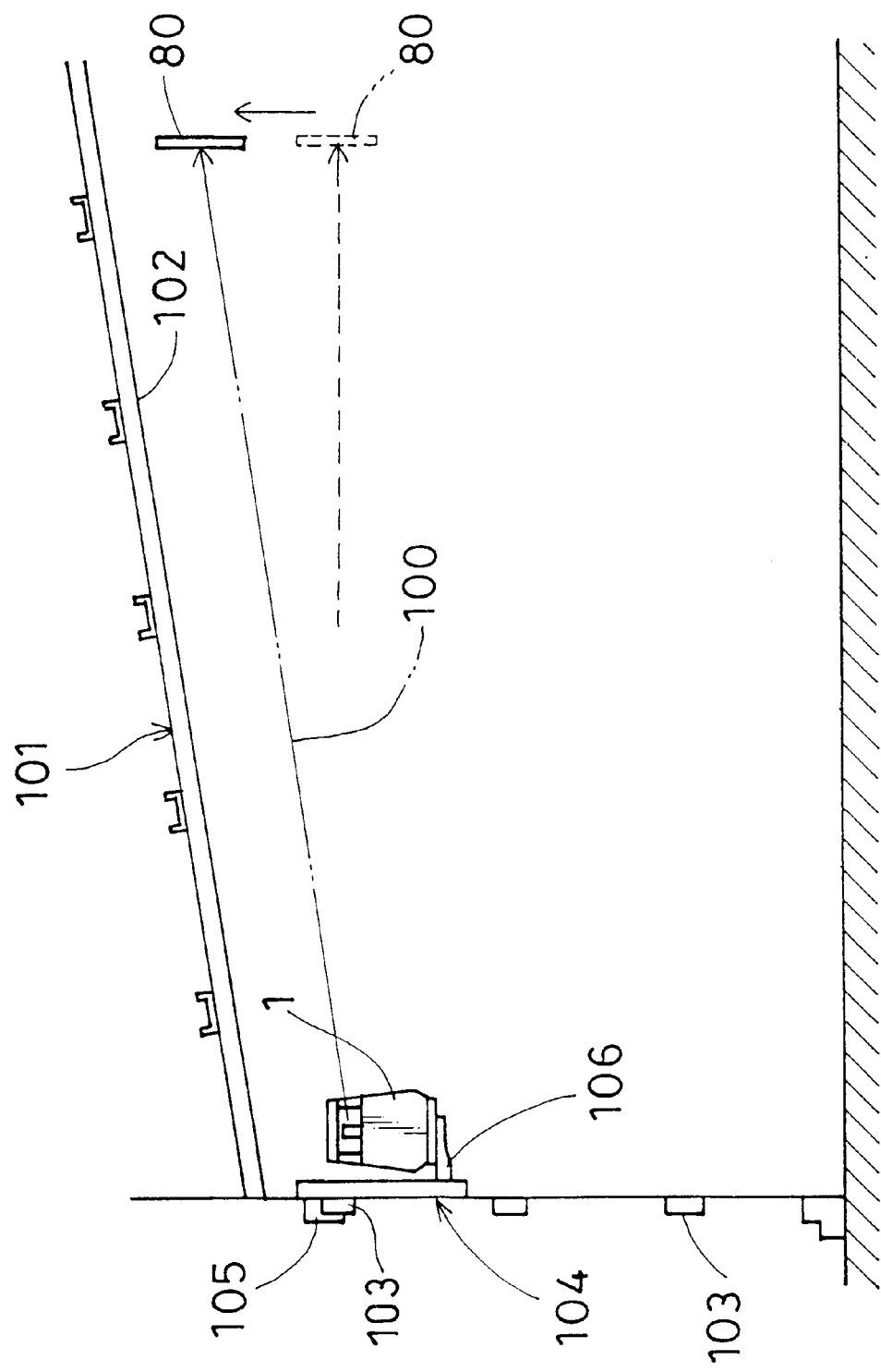
FIG. 11 is a drawing for explaining a concrete case where tilt angle is set in the above embodiment of the invention.
Figure 12:
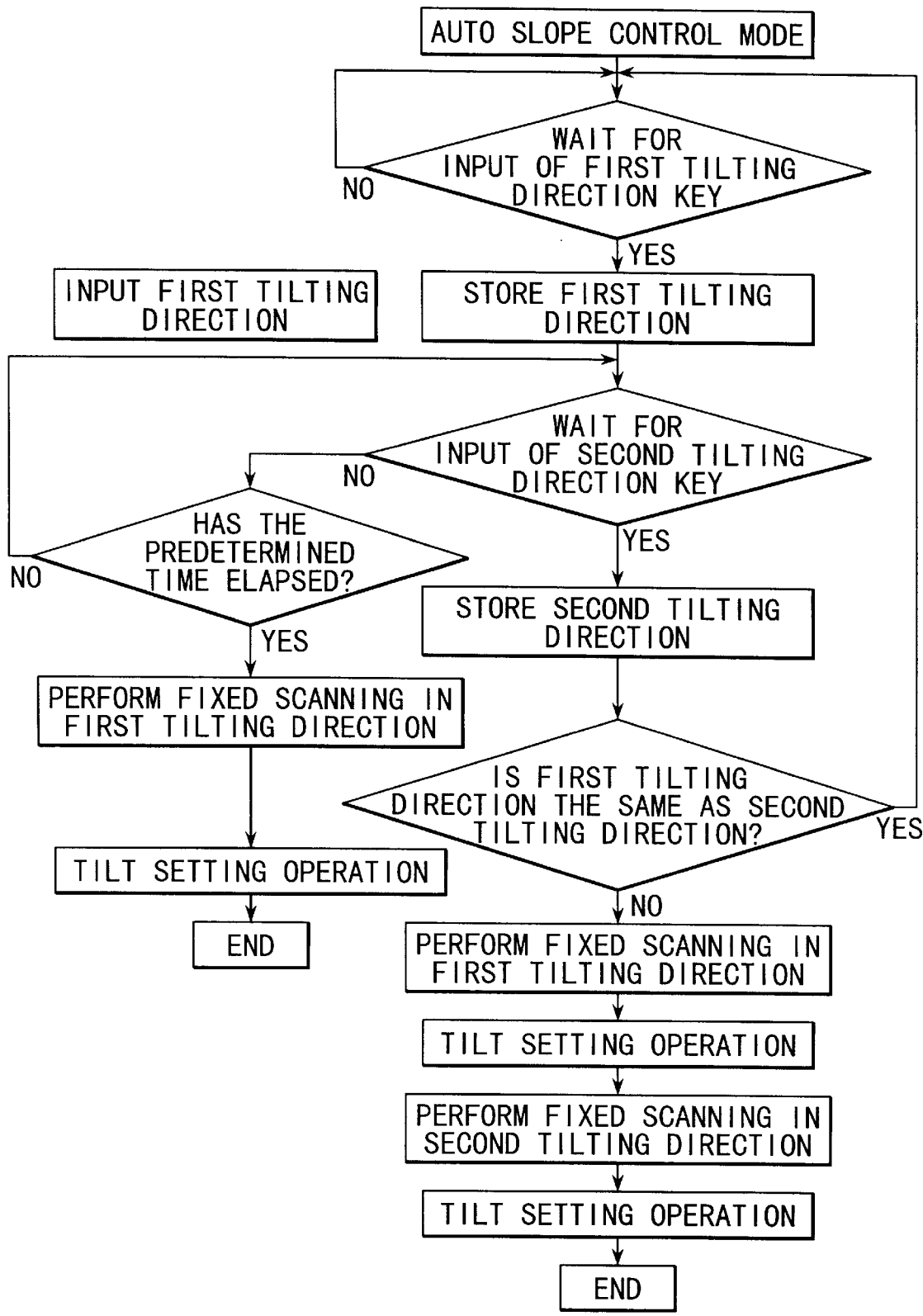
FIG. 12 is a flow chart to show the process of tilting direction setting in the above embodiment of the present invention.

The rotary irradiation system main unit 1 is installed, as shown in FIG. 11, for example, on upper portion of wall of a building 101 near ceiling 102 via a mounting stand 104. The mounting stand 104 has a clamp 105. For example, by clamping a beam 103 on wall surface using the clamp 105, the mounting stand 104 can be fixed on the wall surface. The mounting stand 104 has an elevating table 106, which can be moved up or down to adjust the vertical position of the stand. The rotary irradiation system main unit 1 is fixed on the elevating table 106 using fixing means such as bolt.

After fixing the main unit at a predetermined position, the power source button 93 on the control panel 63 is pressed, and the rotary irradiation system main unit 1 is started to operate. In the following, description will be given on the operation referring to FIG. 12 and FIG. 13.

The rotary irradiation system main unit 1 starts to perform the leveling operation as described above. It is operated in such manner that the polarize d irradiation light beam 100 can be irradiated in a horizontal direction, and the polarized irradiation light beam 100 is rotated and irradiated in a horizontal direction. One of the tilting direction setting buttons 90a, 90b, 90c and 90d is pressed to set a first tilting direction. The first tilting direction thus set is stored in memory in the control unit 60. In case the second tilting direction is not set within a predetermined time after the setting of the first tilting direction, the polarized irradiation light beam 100 is irradiated toward the first tilting direction, and reciprocal scanning in fan-shaped is performed with the preset scanning angular range. Thus, the setting of tilting direction is completed.

In case the direction to be tilted does not agree with the irradiating direction of the polarized irradiation light beam 100, fixed connection of the rotary irradiation system main unit 1 with the elevating table 106 is loosened, and the rotary irradiation system main unit 1 is rotated as necessary. If leveling is deviated in this case, the leveling operation should be repeated.

Using two or more object reflectors 80, or by moving a single object reflector 80 in a predetermined direction, it is possible to set two or more tilting directions. In the following, description will be given on a case where tilting is set in two directions.

After the first tilting direction has been set, a second tilting direction is set by operating another tilting direction setting button within a predetermined time. Then, the second tilting direction thus set is stored in memory in the control unit 60 just like the first tilting direction. The second tilting direction is compared with the first tilting direction in the control unit 60. If both tilting directions agree with each other, the setting is cancelled. If the second tilting direction is different from the first tilting direction, tilt setting operation is performed on each of the tilting directions. Specifically, the polarized irradiation light beam 100 is irradiated toward the first tilting direction at first, and reciprocal scanning is performed within a preset angular scanning range. By the tilt setting operation, if t1 and t2 agree with each other, the polarized irradiation light beam 100 is irradiated in the second tilting direction after the predetermined time. Then, reciprocal scanning is performed within the preset angular scanning range, and the tilt setting is performed in the same way. The transfer between the tilt setting operation of the first tilting direction and the tilt setting operation of the second tilting direction may be automatically performed after the predetermined time has elapsed, or operator may operate button to transfer the operation.

Figure 13:
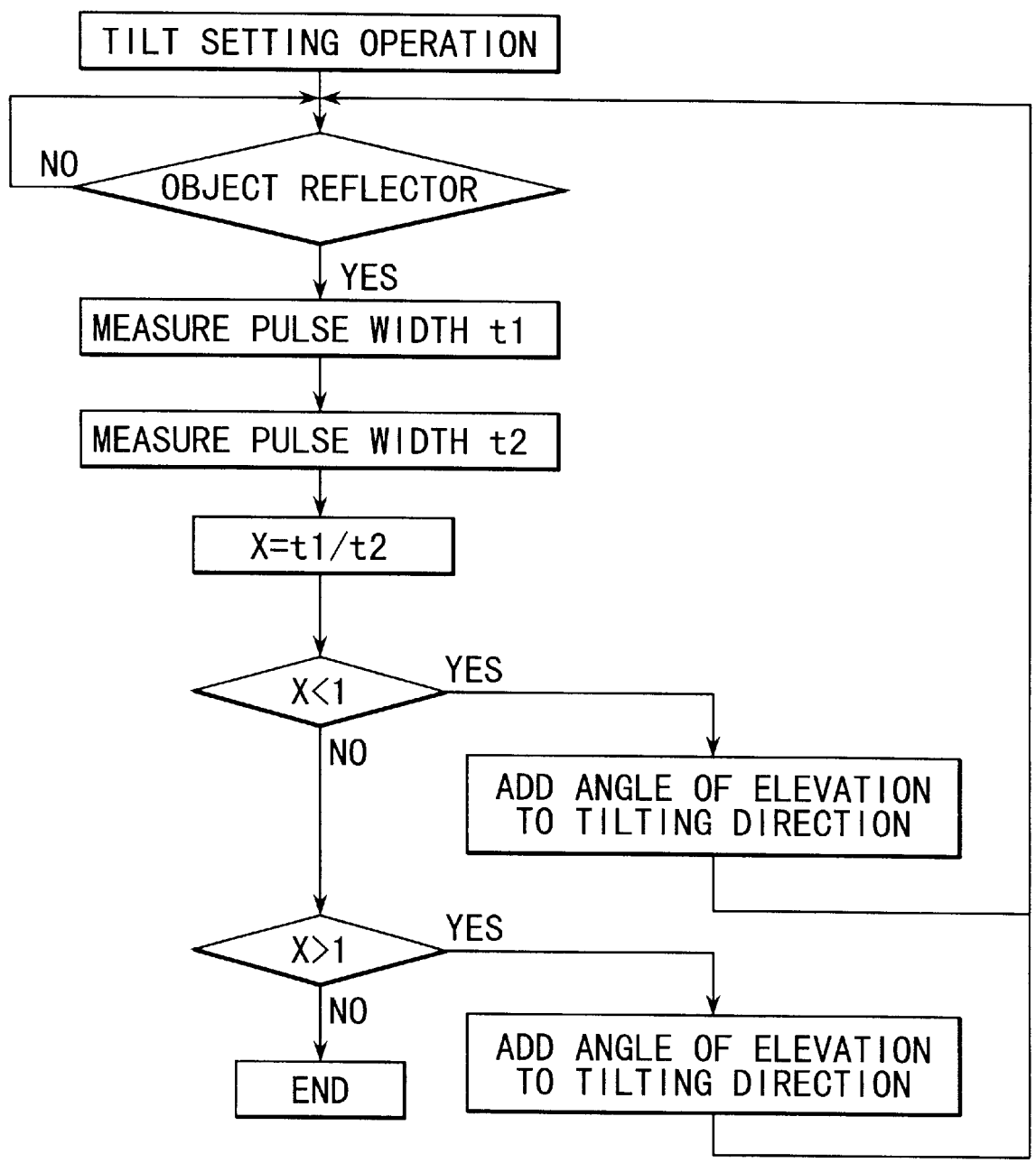
FIG. 13 is a flow chart to show the process of tilting angle setting in the above embodiment of the present invention.

Description will be given now on the tilt setting operation referring to FIG. 13.

Figure 10:
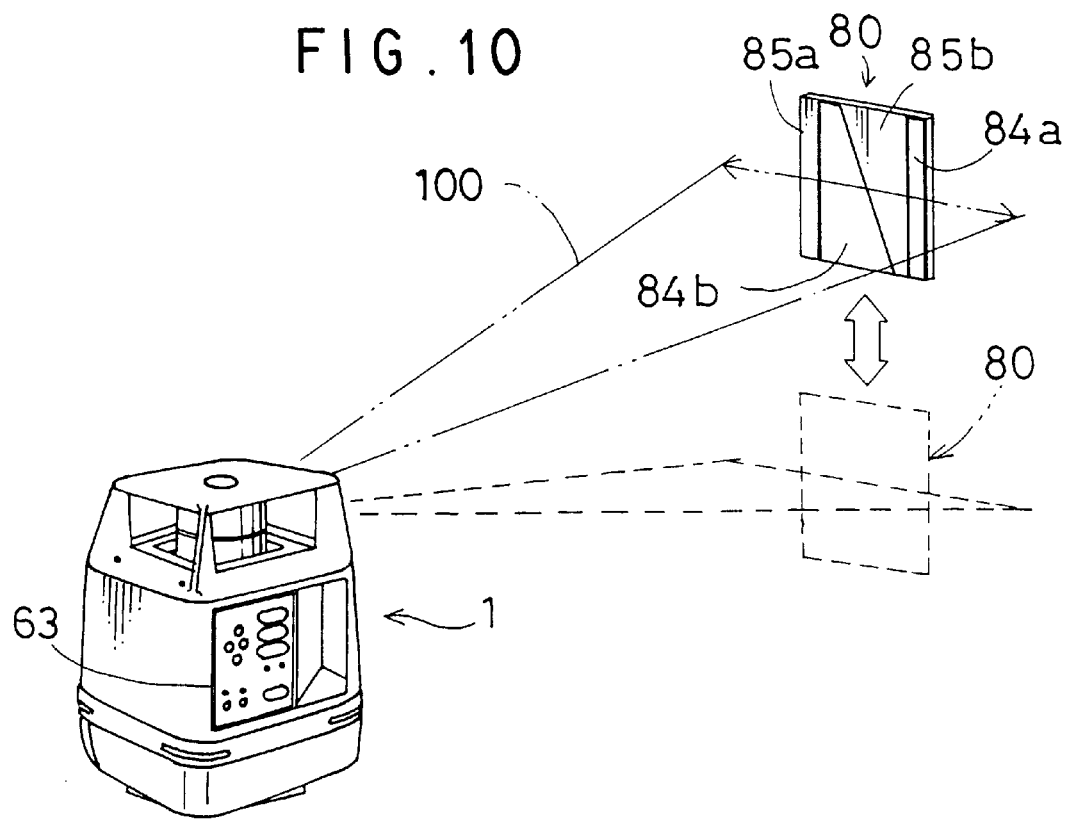
FIG. 10 is a drawing for explaining relationship between the rotary irradiation system main unit and tilt angle setting in the above embodiment of the present invention.

The operator holds the object reflector 80 by hand and keeps it in the polarized irradiation light beam 100 so that the polarized irradiation light beam 100 is irradiated on the object reflector 80. The polarized irradiation light beam 100 scans across the object reflector 80 reciprocally, and reflection light from the object reflector 80 enters the rotary irradiation system main unit 1, and a photodetection signal from the reflection light detector 4 is outputted to the control unit 60. The control unit 60 compares t1 and t2 according to the photodetection signal and adjusts the irradiating direction of the polarized irradiation light beam 100 in a vertical direction to have the result: t1/t2=1. In case the object reflector 80 is set in a predetermined direction, e.g. in case an angle of elevation is to be set, it is moved up as shown in FIG. 10 and FIG. 11. The rotary irradiation system main unit 1 forces the polarized irradiation light beam 100 to trace the object reflector 80 and gives an angle of elevation to it. Angle of elevation or depression of the polarized irradiation light beam 100 is adjusted by tilting the laser projector 10, and tilting of the polarized irradiation light beam 100 based on the determination of the angle of elevation or depression with respect to a horizontal plane agrees with the tilting direction of the laser projector 10.

The object reflector 80 is moved toward a position to be set and is held there for a predetermined time. The rotary irradiation system main unit 1 is operated in such manner that the scanning position of the polarized irradiation light beam 100 is aligned with the center of the object reflector 80. When a predetermined time has elapsed under this condition, it is judged that the tilt setting has been completed, and even when the object reflector 80 is removed, reciprocal scanning of the polarized irradiation light beam 100 is continuously performed at the same position.

When the setting of tilt and the setting of angle of elevation or depression of the polarized irradiation light beam 100 have been completed, the polarized irradiation light beam 100 forms a reference plane in parallel to the ceiling 102. Based on this reference plane, an illuminating lamp is mounted, for example, in a fixed direction from the ceiling.

In case the angle of elevation or depression is already known, the setting value of angle of elevation or depression is inputted to a reference angle 50 as shown in FIG. 4 after leveling. Outputs from the first angle detecting circuit 51 and the second angle detecting circuit 52 are inputted to the computation controller 55. The computation controller 55 drives the first level adjusting motor 31 and the second level adjusting motor 32 via the first motor controller 53 and the second motor controller 54 so that a detection angle from the first angle detecting circuit 51 and the second angle detecting circuit 52 is turned to the reference angle 50.

In the object reflector 80 shown in FIG. 7, the polarization maintaining reflection sectors 84*a* and 84*b* may be reflection surfaces, and the polarization converting reflection sectors 85*a* and 85*b* may be non-reflection surfaces. Also, on the reflection sector with its shape gradually changing, the width at the central position is considered as a known value, and if a comparison value is inputted, there is no need to compare photodetecting conditions from the two reflection sectors, and it is possible to detect the center of the object reflector by comparing the signal width (duration) obtained by the photodetection signal from one reflection sector with the comparison value. Further, the computation controller 55 and the control unit 60 may be replaced with a single control unit, which has the same functions as these components.

As described above, according to the present invention, tilting direction can be set by simply pressing the tilting direction setting button, and the setting of tilt angle can be completed by simply irradiating the polarized irradiation light beam on the object reflector and by moving it to a predetermined position. Accordingly, it is possible to easily set a tilting reference plane and a tilting reference line by extremely simplified working procedure.

What is claimed is:

1. A laser survey instrument, comprising a rotary irradiation system main unit and an object reflector, wherein said rotary irradiation system main unit has a light emitter for emitting a laser beam, a rotator for forming a reference plane by rotating and irradiating a laser beam a tilt setting unit for tilting said reference plane toward at least one direction, setting means for forming a fan-shaped reference plane in a tilt direction by reciprocally scanning said rotator, detecting means having an output for detecting a reflection light beam reflected from said object reflector on said fan-shaped reference plane, a reflection light detecting circuit for identifying a position on said object reflector from said output of said detecting means, and a control unit for controlling said tilt setting unit to direct said fan-shaped reference plane toward a predetermined position on said object reflector based on the detection of said reflection light detecting circuit, wherein a tilting reference plane and a tilting reference line are formed.

2. A laser survey instrument according to claim 1, wherein said object reflector has a reflection sector designed in a shape so as to discriminate the scanning position of the laser beam.

3. A laser survey instrument according to claim 1, wherein said control unit controls said tilt setting unit based on the detection of said reflection light detecting circuit and makes said fan-shaped reference plane trace toward a predetermined position on said object reflector.

4. A laser survey instrument according to claim 1, wherein said object reflector has two or more reflection sectors, at least one of said reflection sectors has a reflection surface with a shape gradually changing, and said reflection light detecting circuit identifies the position on the object reflector from an output of said detecting means.

5. A laser survey instrument according to claim 1, wherein said object reflector has two or more reflection sectors, at least one of said reflection sectors is a polarization converting reflection sector, and at least one of said reflection sectors has a reflection surface with a shape gradually changing, said light emitter of said rotary irradiation system main unit emits a polarized irradiation light beam, said detecting means comprises first detecting means for detecting a direction of polarization different from that of the polarized irradiation light beam emitted from said rotary irradiation system and second detecting means for detecting the same direction of polarization as that of the polarized irradiation light beam irradiated from said rotary irradiation system, and wherein said reflection light detecting circuit identifies the position on said object reflector by comparing an output of said first detecting means with an output of said second detecting means.

6. A laser survey instrument according to claim 3, wherein two tilting directions can be set by setting a second tilting direction within a predetermined time after the setting of a first tilting direction.

7. A laser survey instrument according to claim 3, wherein a tilt angle of the reference plane is set by holding the object reflector for a predetermined duration of time.

8. A laser survey instrument according to claim 4, wherein the laser beam irradiated from said rotator is polarized light, and the reflection sectors of said object reflector reflect light maintaining the direction of polarization.

9. A laser survey instrument according to claim 4, wherein the laser beam irradiated from said rotator is polarized light, and the reflection sectors of said object reflector reflect light converting the direction of polarization.

10. A laser survey instrument according to claim 5, wherein said polarized irradiation light beam irradiated from said rotator is circularly polarized light.

* * * * *